US012705406B2

(12) United States Patent
Jia

(10) Patent No.: US 12,705,406 B2
(45) Date of Patent: Aug. 11, 2026

(54) INFORMATION PROCESSING METHOD AND DEVICE AND PROCESSOR

(71) Applicant: Smarter Silicon (Shanghai) Technologies Co., Ltd., Shanghai (CN)

(72) Inventor: Yongquan Jia, Shanghai (CN)

(73) Assignee: Smarter Silicon (Shanghai) Technologies Co., Ltd., Shanghai (CN)

( * ) Notice: Subject to any disclaimer, the term of this patent is extended or adjusted under 35 U.S.C. 154(b) by 82 days.

(21) Appl. No.: 18/784,378

(22) Filed: Jul. 25, 2024

(65) Prior Publication Data

US 2025/0045468 A1 Feb. 6, 2025

(30) Foreign Application Priority Data

Jul. 31, 2023 (CN) ......................... 202310955213.9

(51) Int. Cl.
*G06F 21/79* (2013.01)
*G06F 21/60* (2013.01)

(52) U.S. Cl.
CPC ............ *G06F 21/79* (2013.01); *G06F 21/604* (2013.01)

(58) Field of Classification Search
CPC . G06F 21/79; G06F 21/604; G06F 2221/2113
See application file for complete search history.

(56) References Cited

U.S. PATENT DOCUMENTS 9,305,142 B1 * 4/2016 Ybarra .................... G06F 21/79
2006/0155939 A1 * 7/2006 Nagasoe ................. G06F 3/062 711/E12.019
2007/0220276 A1 * 9/2007 Croxford ................ G06F 21/74 713/193
2011/0078760 A1 * 3/2011 De Perthuis ............ G06F 21/79 726/1
2012/0036347 A1 * 2/2012 Swanson ................. G06F 21/85 711/E12.091
2014/0181234 A1 * 6/2014 Hsiao .................... G06F 16/273 709/213
2014/0344562 A1 * 11/2014 Kim ........................ G06F 21/79 713/2
2014/0344846 A1 * 11/2014 Yamamura ......... H04N 21/2396 725/25
2015/0370727 A1 * 12/2015 Hashimoto ............. G06F 21/64 711/163
2018/0176417 A1 * 6/2018 Ando .................... G06F 21/629
2019/0095651 A1 * 3/2019 Yokoi ................... G06F 21/604
2019/0332792 A1 * 10/2019 Kunii .................. G06F 21/6218

(Continued)

FOREIGN PATENT DOCUMENTS

CN 110764708 A * 2/2020 ............. G06F 3/061

*Primary Examiner* — Amir Mehrmanesh
*Assistant Examiner* — Aayush Aryal
(74) *Attorney, Agent, or Firm* — ANOVA LAW GROUP, PLLC

(57) ABSTRACT

An information processing method implemented by a processor having at least two instruction modules. The method includes obtaining data reading information, the data reading information being used to read target data; obtaining a data type of the target data, different data types corresponding to different security levels; and based on the data type, triggering a target instruction module corresponding to the data type security level of the target data to generate an access request to access a target storage area where the target data is located.

9 Claims, 7 Drawing Sheets

(56) References Cited

U.S. PATENT DOCUMENTS

| | | | | |
|---|---|---|---|---|
| 2020/0210076 | A1* | 7/2020 | Murphy | G06F 3/0655 |
| 2020/0379923 | A1* | 12/2020 | Lidman | G06F 12/1458 |
| 2021/0192088 | A1* | 6/2021 | Mcgibney | G06F 21/74 |
| 2021/0209251 | A1* | 7/2021 | Parthasarathy | G06F 21/602 |

* cited by examiner

INFORMATION PROCESSING METHOD AND DEVICE AND PROCESSOR

CROSS-REFERENCES TO RELATED APPLICATION

This application claims priority to Chinese Patent Application No. 202310955213.9 filed on Jul. 31, 2023, the entire content of which is incorporated herein by reference.

FIELD OF TECHNOLOGY

The present disclosure relates to the field of information technology and, more specifically, to an information processing method, an information processing device, and a processor.

BACKGROUND

A lot of data running or stored on mobile devices has become a high-value enterprise asset that needs to be protected on the device side.

In conventional technology, only offline security of high-value data can be ensured by encrypting and storing the data in an external storage device. For example, before the Neural Processing Unit (NPU) in a mobile device loads data, the decrypted high-value data is stored in a non-secure memory.

However, any master in the mobile device can read the high-value data in the non-secure memory, which affects the security of the high-value data.

SUMMARY

One aspect of this disclosure provides an information processing method implemented by a processor, the processor including at least two instruction modules. The method includes obtaining data reading information, the data reading information being used to read target data; obtaining a data type of the target data, different data types corresponding to different security levels; and based on the data type, triggering a target instruction module corresponding to the data type security level of the target data to generate an access request to access a target storage area where the target data is located.

Another aspect of the present disclosure provides an information processing method applied to a storage area controller. The method includes receiving an access request; analyzing the access request to obtain target data and a target instruction module identifier of a target access, the target instruction module being an instruction module in a processor for requesting the target data, the processor including at least two instruction modules, different instruction modules being configured to access data of different security levels; based on the target instruction module identifier, determining whether the target instruction module has permission to read the target data in a target storage area; and if the target instruction module has the permission to read the target data in the target storage area, feeding the target data in the target storage area back to the target instruction module.

Another aspect of the present disclosure provides an information processing device applied to a processor, the processor including at least two instruction modules. The device includes an acquisition module and a trigger module. The acquisition module is configured to obtain a data type of target data, different data types corresponding to different security levels. The trigger module is configured to, based on the data type, trigger a target instruction module corresponding to the data type security level of the target data to generate an access request to access a target storage area where the target data is located.

Another aspect of the present disclosure provides an information processing device applied to a storage area controller. The device includes a receiving module, an analysis module, a determination module, and a feedback module. The receiving module is configured to receive an access request. The analysis module is configured to analyze the access request and obtain target data and a target instruction module identifier of a target access, the target instruction module being an instruction module in a processor for requesting the target data, the processor including at least two instruction modules, different instruction modules being configured to access data of different security levels. The determination module is configured to, based on the target instruction module identifier, determine whether the target instruction module has permission to read the target data in a target storage area. The feedback module is configured to, if the target instruction module has the permission to read the target data in the target storage area, feed the target data in the target storage area back to the target instruction module.

Another aspect of the present disclosure provides a processor that includes a model download module, a data download module, and a control module. The control module is configured to obtain data reading information, the data reading information being used to read target data; obtain a data type of the target data, different data types corresponding to different security levels; and, based on the data type, trigger the model download module or the data download module corresponding to the data type security level of the target data to generate an access request to access a target storage area where the target data is located.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION

The technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

To control any master from reading high-value data in the non-secure memory, in conventional technology, the memory can be divided into secure memory and non-secure memory, and the high-value data can be stored in the secure memory. Take accessing Artificial Intelligence (AI) data as an example. When the NPU accesses high-value data, such as AI model data, the NPU switches to a secure mode. When the NPU needs to access non-secure data stored in the non-secure memory, the NPU switches to a non-secure mode.

Since AI models are important high-value data and are used more and more frequently, this will cause the NPU in the device to frequently switch between the secure mode and the non-secure mode, which affects the operating efficiency of the device.

Therefore, an embodiment of the present disclosure provides an information processing method in which multiple instruction modules are arranged in a processor for accessing high-value data, and each instruction module has the permission to access data of different security levels. For example, in the NPU, corresponding instruction modules can be arranged for AI model data and common data respectively, and there is no need to switch modes when accessing data of different security levels.

Figure 1:
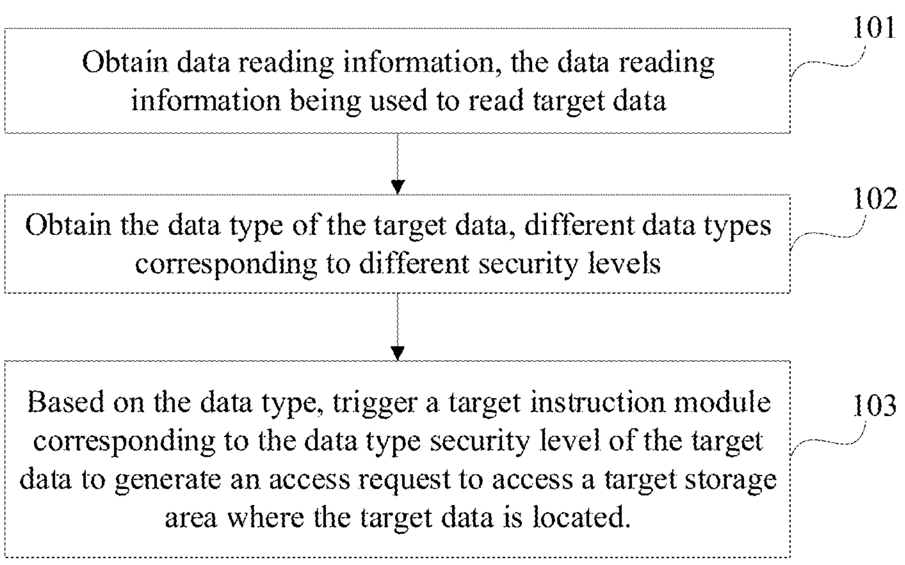
FIG. 1 is a flowchart of an information processing method according to an embodiment of the present disclosure.

FIG. 1 is a flowchart of an information processing method according to an embodiment of the present disclosure. The method can be applied to a processor, which may include at least two instruction modules. The method will be described in detail below.

101, obtaining data reading information, the data reading information being used to read target data.

In some embodiments, the target data may be stored in a random-access memory (RAM), which can store data with different security levels.

In some embodiments, when obtaining the data reading information, the data reading information may be issued based on the configuration of the central processing unit (CPU) in an electronic device.

In some embodiments, the CPU may pre-configure the conditions for triggering data reading information into the register. During the operation of the electronic device, if the conditions are met, generation of the data reading information can be triggered.

In some embodiments, only one processor for executing an information processing method of the present disclosure may be arranged in the electronic device, and other masters may only read data of one security level in the memory. In addition, the permission to obtain data of different security levels may be executed by one processor, thereby reducing changes to the processor structure in the electronic devices.

In some embodiments, multiple processors for executing the information processing method of the present disclosure may also be provided in the electronic device such that the task of obtaining data of different security levels can be distributed and executed by multiple processors. In some cases, if a processor fails, other processors can take over the function of the failed processor to reduce system risks.

102, obtaining the data type of the target data, different data types corresponding to different security levels.

In some embodiments, after the data reading information is obtained, the data type of the target data to be read may be determined.

In some embodiments, the different data types may be stored in different storage areas. Different data types may have different security levels. Different storage areas of the memory may be used to store data with different security levels.

The process of obtaining the data type of the target data will be described in detail in the subsequent embodiments and will not be described in detail here.

103, based on the data type, triggering a target instruction module corresponding to the data type security level of the target data to generate an access request to access a target storage area where the target data is located.

In some embodiments, multiple instruction modules of the processor may have the permission to read data of different data types.

Correspondingly, after determining the data type, the instruction module corresponding to the security level of the data type may be the determined to trigger the corresponding instruction module to generate an access request.

For example, after determining that the data type of the target data is a first type and an instruction module A corresponds to the security level of the first type, the instruction module A can be triggered to generate an access request to access the target data stored in the memory based on the access request.

In some embodiments, based on the data of different security levels stored in the memory, the number of instruction modules arranged in the processor may correspond to the number of security levels to support multiple security levels.

For example, the memory may store data of two security levels. Correspondingly, the processor may include two instruction modules, and the two instruction modules may have the permission to read the data of the corresponding security levels. More specifically, instruction module 1 may have the permission to read data of first security level, and instruction module 2 may have the permission to read data of second security level.

In another example, the memory may store data of three security levels. Correspondingly, the processor may include three instruction modules, and the three instruction modules may have the permission to read the data of the corresponding security levels. More specifically, instruction module 1 may have the permission to read data of first security level, instruction module 2 may have the permission to read data of second security level, and instruction module 3 may have the permission to read data of third security level.

The process of triggering the target instruction module to generate an access request will be described in detail in the subsequent embodiments, and will not be described here.

In some embodiments, the access request may include identification information corresponding to the target instruction module, and the identification information may match the security attribute of the target storage area where the target data is located.

In some embodiments, the target instruction module may include identification information corresponding to the target instruction module. The identification information of the access request may indicate that the access request is generated by the target instruction module, and the target instruction module may correspond to the security level of the data type and have the permission to access the target data. The identification information corresponding to the target instruction module in the access request may match the security attribute of the target storage area where the target data is located such that each instruction module in the processor has access rights to data of different security levels. In this way, the processor does not need to switch modes when accessing data at different security levels.

Consistent with the present disclosure, the information processing method can be applied to a processor including at least two instruction modules. The information processing method includes obtaining the data reading information, the data reading information being used to read target data; obtaining the data type of the target data, different data types corresponding to different security levels; and based on the data type, triggering the target instruction module corresponding to the data type security level of the target data to generate an access request to access a target storage area where the target data is located. In some embodiments, after obtaining the data reading information, the processor may obtain the data type of the to-be-read target data, and then determine the target instruction module corresponding to the security level of the data type based on the data type to generate an access request to access the target storage area where the target data is located. In this way, a processor can access data of different security levels in the storage area, and data of different security levels can only be accessed by modules corresponding to the security level, thereby improving data security in the memory. In addition, there is no need to switch the security state of the processor, nor is there a need to set requirements for the security level of the data processed by the processor.

Figure 2:
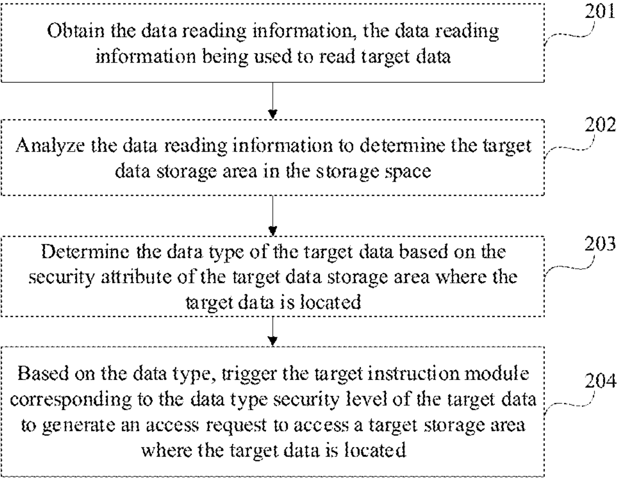
FIG. 2 is a flowchart of the information processing method according to an embodiment of the present disclosure.

FIG. 2 is a flowchart of the information processing method according to an embodiment of the present disclosure. The method will be described in detail below.

201, obtaining the data reading information, the data reading information being used to read target data.

The process at 201 is consistent with the corresponding process at 101 and will not be described in detail here.

202, analyzing the data reading information to determine the target data storage area in the storage space.

In some embodiments, the storage space may include multiple storage areas, each of which can be configured with corresponding security attributes.

In some embodiments, the storage space may be a memory.

In some embodiments, the storage space may be divided into multiple storage areas based on different security attributes, such as normal memory area, secure memory area, and protected memory area. Of course, in specific implementations, the division form, number and naming of the storage areas are not limited thereto, and can be set based on the actual situation.

In some embodiments, different storage areas may be read by different instruction modules.

More specifically, the data read request may carry the target data storage address where the target data is located, and the target data storage area to which the target data belongs may be determined based on the target data storage address. The data read request may be analyzed to determine the target data storage area carried therein.

203, determining the data type of the target data based on the security attribute of the target data storage area where the target data is located.

In some embodiments, after determining the target data storage area where the target data is located, the security attribute of the target data storage area may be determined, then the data type of the target data may be determined based on the security attribute.

More specifically, the processor may pre-store the correspondence between various data storage areas and security attributes. After the target data storage area where the target data is located is determined, the security attribute of the target data storage area may be determined based on the correspondence.

In some embodiments, the processor may also pre-store the correspondence between the security attribute and the data type.

In some embodiments, the security attributes may include different attributes such as normal, secure, and protected, and different attributes may correspond to different data types.

In some embodiments, the data type corresponding to the normal security attribute may be common data, the data type corresponding to the secure security attribute may be secure data, and the data type corresponding to the protected security attribute may be protected data.

It should be noted that the classification of the security attributes is not limited to the above description. In specific implementations, the security attributes may be divided and different security names may be used based on actual conditions.

204, based on the data type, triggering the target instruction module corresponding to the data type security level of the target data to generate an access request to access a target storage area where the target data is located.

The process at 204 is consistent with the corresponding process at 103 and will not be described in detail here.

Consistent with the present disclosure, the information processing method includes analyzing the data reading information to determine the target data storage area in the storage space, the storage space including multiple storage areas, each of which being configured with corresponding security attributes; and determining the data type of the target data based on the security attribute of the target data storage area where the target data is located. In this embodiment, the target data storage area of the storage space can be determined based on the data reading information, and the data type of the target data can be determined based on the security attribute of the target data storage area. Since the data type can be determined based on the storage location of the target data in the storage space, the data type can be directly associated with the physical address of the target data and is not easily tampered with. There is no need to analyze the data content, which reduces the processing burden of the processor.

Figure 3:
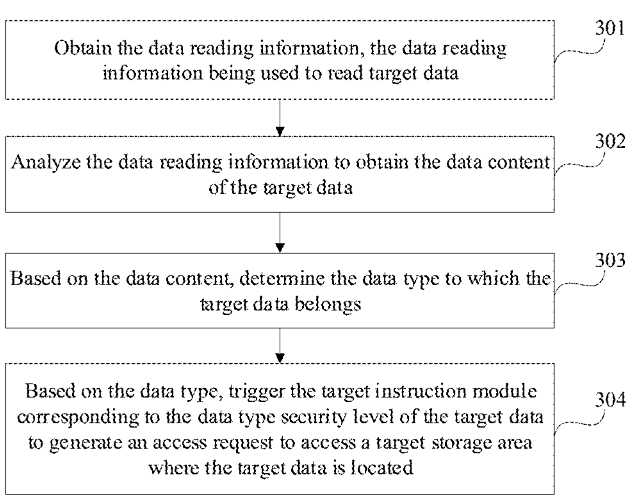
FIG. 3 is a flowchart of the information processing method according to an embodiment of the present disclosure.

FIG. 3 is a flowchart of the information processing method according to an embodiment of the present disclosure. The method will be described in detail below.

301, obtaining the data reading information, the data reading information being used to read target data.

The process at 301 is consistent with the corresponding process at 101 and will not be described in detail here.

302, analyzing the data reading information to obtain the data content of the target data.

It should be noted that, in some embodiments, the high-value data that needs to be securely protected may be illustrated using AI model data as an example.

In some embodiments, the data content may include model data, common data, and other data with different security levels. The corresponding relationship between different data contents and data types may also be set in advance.

In some embodiments, the common data may be non-model data, such as data that can be used as input to an AI model.

For example, the data content may include AI model data, common data, etc.

In some embodiments, as data that requires security protection, the security level of the AI model data may be higher than the security level of the common data.

Correspondingly, the data reading information can be analyzed to determine whether the target data read by the target is AI model data, or whether the target data read by the target is common data.

It should be noted that the data content of the target data is not limited to the AI model data and common described above, and the form of the data content can be set based on the actual situation, which is not limited in the embodiments of the present disclosure.

303, based on the data content, determining the data type to which the target data belongs.

In some embodiments, the processor that executes this process may have a preset correspondence between the data content and the data type.

More specifically, the data type to which the target data belongs may be determined based on the determined data content and its correspondence.

For example, if the data content is AI model data, the data type to which the target data belongs may be determined as a secure type; if the data content is common data, the data type to which the target data belongs may be determined as a common type.

In specific implementations, the correspondence between data content and data type may be set based on actual conditions.

304, based on the data type, triggering the target instruction module corresponding to the data type security level of the target data to generate an access request to access a target storage area where the target data is located.

The process at 204 is consistent with the corresponding process at 103 and will not be described in detail here.

Consistent with the present disclosure, the information processing method includes analyzing the data reading information to obtain the data content of the target data, and based on the data content, determining the data type to which the target data belongs. In this embodiment, the data content of the target data can be obtained based on the data reading information, and the data type of the target data can be determined based on the data content. The data type of the target data can be determined based on the content of the target data itself. There is no need to associate the physical address of the target data, which can be configured based on the target data itself, which is more flexible.

Figure 4:
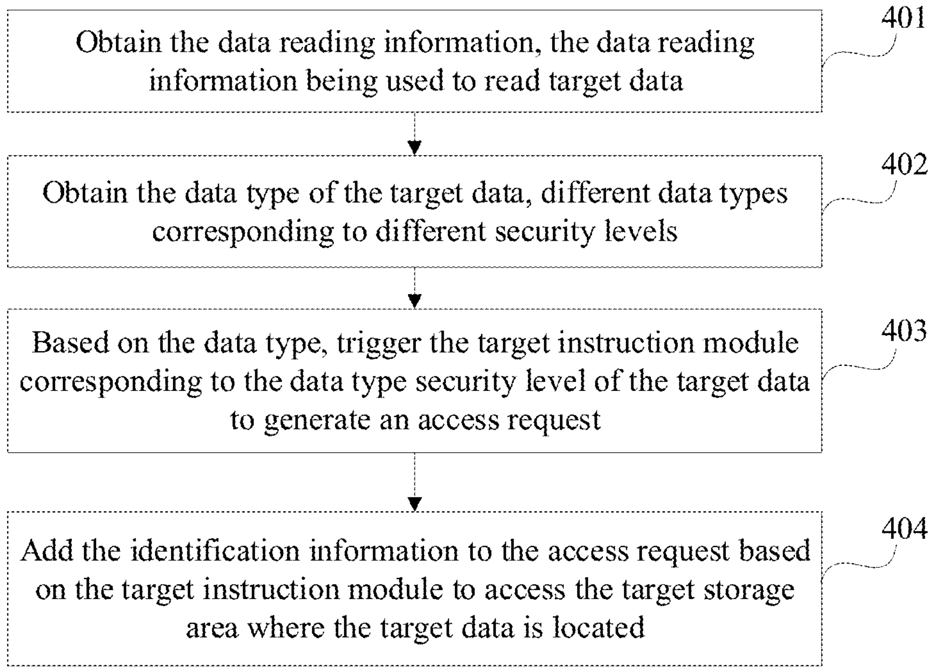
FIG. 4 is a flowchart of the information processing method according to an embodiment of the present disclosure.

FIG. 4 is a flowchart of the information processing method according to an embodiment of the present disclosure. The method will be described in detail below.

401, obtaining the data reading information, the data reading information being used to read target data.

402, obtaining the data type of the target data, different data types corresponding to different security levels.

403, based on the data type, triggering the target instruction module corresponding to the data type security level of the target data to generate an access request.

The processes at 401-403 are consistent with the corresponding processes at 101-103 and will not be described in detail here.

404, adding the identification information to the access request based on the target instruction module to access the target storage area where the target data is located.

In some embodiments, the identification information may indicate that the access request is generated by the target instruction module.

In some embodiments, after the triggering instruction module generates an access request, the identification information may be added to the access request based on the target instruction module.

In some embodiments, the identification information may be information used to reflect the target instruction module.

In some embodiments, the access request generated by each master in the electronic device may carry the ID of the master, and the access request generated by the processor executing the information processing method of the present disclosure may carry the ID of the instruction module that generates the access request.

More specifically, the ID may be a non-secure access identity.

It should be noted that the processor executing the information processing method of the present disclosure may be capable of reading both common data and secure data. More specifically, different instruction modules of the processor may read data of different security levels in the memory. Correspondingly, different IDs may be added to the access requests generated by different instruction modules such that the processor can read data of different security levels.

In some embodiments, the memory may include three categories: secure memory, normal memory, and protected memory. Different memories may have different storage areas, which store different categories of data. The secure memory may only be accessed by the secure master; the normal memory may be accessed by both the secure master and the non-secure master; the protected memory may be restricted to be accessible only by the non-secure master with the specified NASID.

In some embodiments, different instruction modules may be used to implement access to normal memory and protected memory.

Consistent with the present disclosure, the information processing method includes adding the identification information to the access request based on the target instruction module, the identification information indicating that the access request is generated by the target instruction module. In this embodiment, access requests may be generated based on the target instruction module corresponding to the data type of the target data, and the identification information may be added to the access requests based on the target instruction module. The identifier in the access request may indicate that the access request is made by the target instruction module, and provides a basis for subsequent access to the target data in the target data storage area in the storage space based on the access request.

Figure 5:
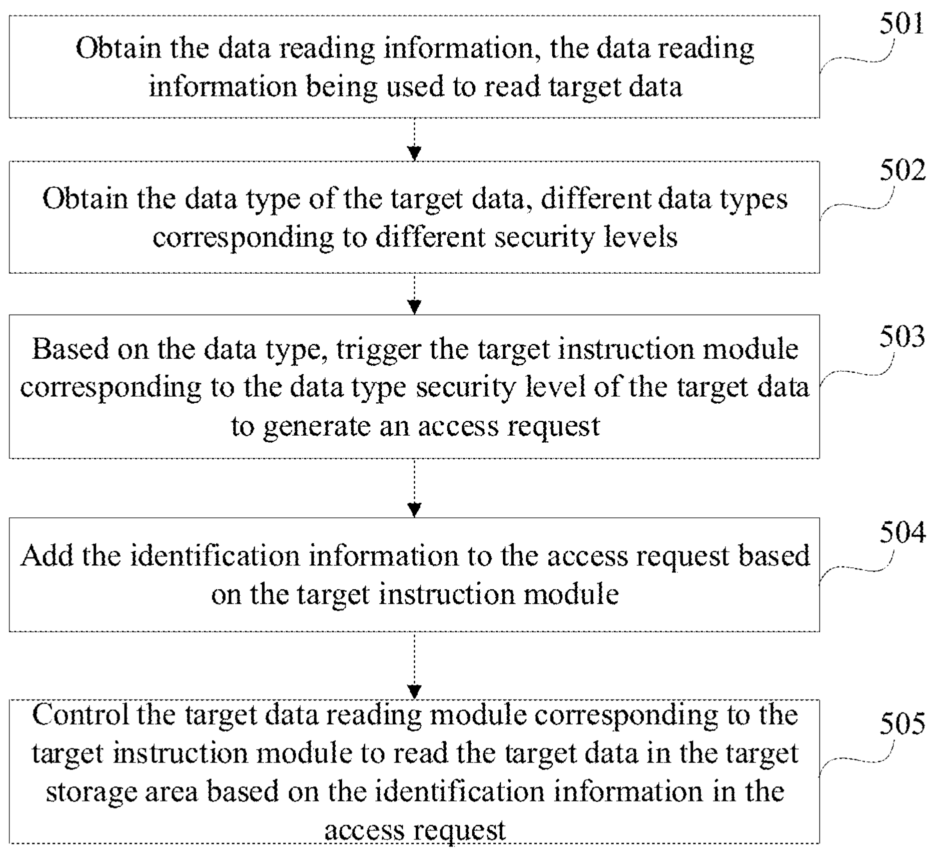
FIG. 5 is a flowchart of the information processing method according to an embodiment of the present disclosure.

FIG. 5 is a flowchart of the information processing method according to an embodiment of the present disclosure. The method will be described in detail below.

501, obtaining the data reading information, the data reading information being used to read target data.

502, obtaining the data type of the target data, different data types corresponding to different security levels.

503, based on the data type, triggering the target instruction module corresponding to the data type security level of the target data to generate an access request.

504, adding the identification information to the access request based on the target instruction module.

The processes at 501-504 are consistent with the corresponding processes at 401-404 and will not be described in detail here.

505, controlling the target data reading module corresponding to the target instruction module to read the target data in the target storage area based on the identification information in the access request.

In some embodiments, the target data reading module may be arranged in the processor or may be arranged outside the processor. The target data reading module may be used to upload the access request to a bus to send the access request to the memory through the bus to read the target data in the target storage area of the memory.

In some embodiments, a corresponding data reading module may be arranged for each instruction module of the processor to achieve an access channel for each instruction module.

For example, the processor may include two instruction modules. Correspondingly, two data reading modules may also be provided, each reading module corresponding to an instruction module.

In some embodiments, based on the triggered target instruction module, the corresponding target data reading module may be triggered to read the target data based on the identification information in the access request.

In a specific implementation, the data reading module may use direct memory access (DMA).

Consistent with the present disclosure, the information processing method includes controlling the target data reading module corresponding to the target instruction module to read the target data in the target storage area based on the identification information in the access request. In this embodiment, a corresponding data reading module is set for each instruction module of the processor, and the data of the target storage area is read through the target data reading module corresponding to the target instruction module. More specifically, the target data in the target storage area is read based on the identification information in the access request such that an independent reading channel can be established to achieve fast reading of the target data.

Figure 6:
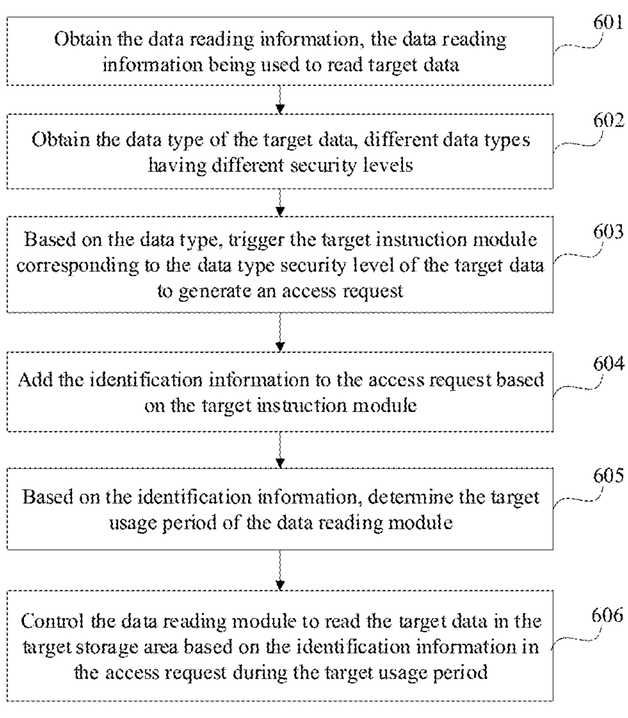
FIG. 6 is a flowchart of the information processing method according to an embodiment of the present disclosure.

FIG. 6 is a flowchart of the information processing method according to an embodiment of the present disclosure. The method will be described in detail below.

601, obtaining the data reading information, the data reading information being used to read target data.

602, obtaining the data type of the target data, different data types corresponding to different security levels.

603, based on the data type, triggering the target instruction module corresponding to the data type security level of the target data to generate an access request.

604, adding the identification information to the access request based on the target instruction module.

The processes at 601-604 are consistent with the corresponding processes at 401-404 and will not be described in detail here.

605, based on the identification information, determining the target usage period of the data reading module.

In some embodiments, the data reading module may be arranged in the processor, or it may be arranged outside the processor. The data reading module may be configured to upload the access request to the bus, thereby sending the access request to the memory through the bus to realize the reading of the target data in the target storage area of the memory.

In some embodiments, multiple instruction modules of the processor may share a data reading module by using a time-division multiplexing scheme. More specifically, the time-sharing periods during which each instruction module of the processor uses the data reading module may be arranged in advance.

For example, the time-sharing period occupied by an instruction module is agreed upon, such as 20 milliseconds, and there may be two instruction modules A and B. Instruction module A occupies the data reading module for 20 milliseconds, and instruction module occupies the data reading module for 20 milliseconds. When instruction module A occupies the data reading module, the access request generated by the instruction module B needs to wait until the corresponding occupation time of instruction module B is reached, and then the data reading module can respond to the access request generated by instruction module B.

For example, the occupation time for each instruction module can be agreed upon as 10 milliseconds, and the instruction module usage order can also be agreed upon in advance, then the time-sharing periods of each data reading module can be determined based on the usage duration and usage.

It should be noted that, in some cases, a separate data reading module may be arranged for the processor such that multiple instruction modules in the processor can share the data reading module. Other control units may be arranged with independent data reading modules, and the reading requests of other control units may be processed by their corresponding data reading modules. The processor and other control units may also share the same data reading module in the time-division multiplexing manner described above.

In some embodiments, the instruction module that generated the access request may be determined based on the identification information, and the target usage period of the instruction module may be determined based on the agreed time-sharing period.

In a specific implementation, the data reading module may use DMA.

606, controlling the data reading module to read the target data in the target storage area based on the identification information in the access request during the target usage period.

In some embodiments, after determining the target usage period corresponding to the target instruction module, the data reading module may be controlled to respond to the access request in the target usage period.

More specifically, the data reading module may be configured to read the target data in the target storage area in the target usage period based on the identification information in the access request.

Consistent with the present disclosure, the information processing method includes determining the target usage period of the data reading module based on the identification information, and controlling the data reading module to read the target data in the target storage area based on the identification information in the access request during the target usage period. In this embodiment, each instruction module of the processor can use the data reading module in a time-sharing manner. The target usage period of the target reading module corresponding to an access request can be determined, and the data reading module can be controlled to read the target data based on the access request during the target usage period. In this way, the structure of the data reading module is simple and reading conflicts in the data reading module can be avoided.

Figure 7:
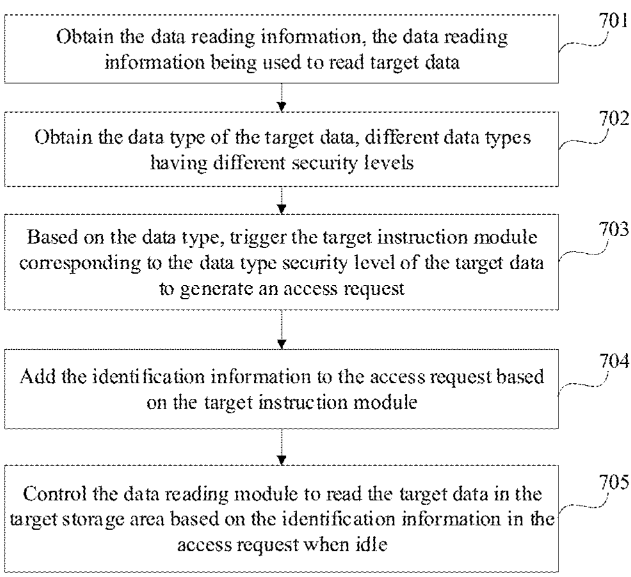
FIG. 7 is a flowchart of the information processing method according to an embodiment of the present disclosure.

FIG. 7 is a flowchart of the information processing method according to an embodiment of the present disclosure. The method will be described in detail below.

701, obtaining the data reading information, the data reading information being used to read target data.

702, obtaining the data type of the target data, different data types corresponding to different security levels.

703, based on the data type, triggering the target instruction module corresponding to the data type security level of the target data to generate an access request.

704, adding the identification information to the access request based on the target instruction module.

The processes at 701-704 are consistent with the corresponding processes at 401-404 and will not be described in detail here.

705, controlling the data reading module to read the target data in the target storage area based on the identification information in the access request when idle.

In some embodiments, the data reading module may be arranged in the processor, or it may be arranged outside the processor. The data reading module may be configured to upload the access request to the bus, thereby sending the access request to the memory through the bus to realize the reading of the target data in the target storage area of the memory.

In some embodiments, multiple instruction modules of the processor may share the data reading module, and any instruction module may be used when the data reading module is idle.

In some embodiments, after receiving the access request with the identification information, if there is a need to read the target data in the storage space based on the access request, arbitration may need to be performed based on the state of the data reading module.

In some embodiments, if the data reading module is currently idle, it may be determined that the target data can be read through the data reading module; if the data reading module is currently occupied, the process may be put on hold until the data reading module is idle before reading.

It should be noted that, in some cases, a separate data reading module may be arranged for the processor such that multiple instruction modules in the processor can share the data reading module. Other control units may be arranged with independent data reading modules, and the reading requests of other control units may be processed by their corresponding data reading modules. The processor and other control units may also share the same data reading module in the arbitration manner described above.

In a specific implementation, the data reading module may use DMA.

Consistent with the present disclosure, the information processing method includes controlling the data reading module to read the target data in the target storage area based on the identification information in the access request when idle. In this embodiment, each instruction module of the processor may use a multiplexed data reading module. After the access request is generated, when the data reading module is idle, the data reading module can be controlled to read the target data in the target storage area based on the access request. In this way, the structure of the data reading module is simple, which prevents the data reading module from reading conflicts.

Figure 8:
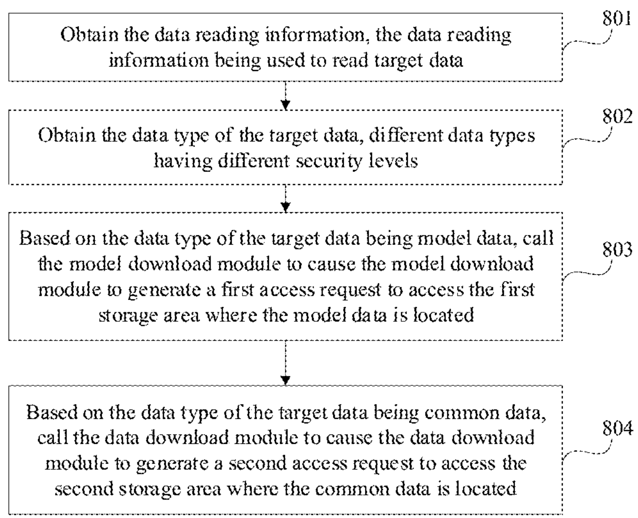
FIG. 8 is a flowchart of the information processing method according to an embodiment of the present disclosure.

FIG. 8 is a flowchart of the information processing method according to an embodiment of the present disclosure. The method will be described in detail below.

801, obtaining the data reading information, the data reading information being used to read target data.

802, obtaining the data type of the target data, different data types corresponding to different security levels.

The processes at 801-802 are consistent with the corresponding processes at 101-102 and will not be described in detail here.

803, based on the data type of the target data being model data, calling the model download module to cause the model download module to generate a first access request to access the first storage area where the model data is located.

In some embodiments, the at least two instruction modules may include a model download module and a data download module.

In some embodiments, the first access request may be used to access the storage area where the model data is located.

In some embodiments, the model download module may access and read the model data in the memory.

In some embodiments, if the model data of the data type of the target data is determined, the model download module in the processor may be called, and the model download module may generate the first access request.

More specifically, the first access request generated by the model download module may be used to access the first storage area where the model data is located in the memory. The first storage area may be a protected area, and only a non-secure master with a specified NASID may access the first storage area.

804, based on the data type of the target data being common data, calling the data download module to cause the data download module to generate a second access request to access the second storage area where the common data is located.

In some embodiments, the second access request may be used to access the storage area where the common data is located.

In some embodiments, the data download module may access and read common data in the memory.

In some embodiments, if the data type of the target data is determined to be common data, the data download module in the processor may be called, and the data download module may generate a second access request.

More specifically, the second access request generated by the data download module may be used to access the second storage area where the common data is located in the memory. The second storage area may be a common area, which is accessible to both the non-secure master and the secure master.

In some embodiments, the processor executing the information processing method may be a neural processing unit (NPU). The NPU may include two instruction modules, namely, the model download module and the data download module. The model download module may be configured to read the AI model in the protected area of the memory, while the data download module may be configured to only read the common data in the memory.

In some embodiments, the AI model may be a model that can process input data. After reading the model, the input data may be processed based on the model. The common data may be used as input data for the AI model.

Consistent with the present disclosure, the information processing method includes, based on the data type of the target data being model data, calling the model download module to cause the model download module to generate a first access request to access the first storage area where the model data is located, and based on the data type of the target data being common data, calling the data download module to cause the data download module to generate a second access request to access the second storage area where the common data is located. In this embodiment, by decoupling model data and common data, the processor can read data with two security levels separately. While protecting the AI model, there is no need to limit the security level requirements of the data to be processed by the NPU.

Corresponding to the information processing method described in the foregoing embodiments that can be applied to a processor, an embodiment of the present disclosure also provides an information processing method that can be applied to a storage area controller.

Figure 9:
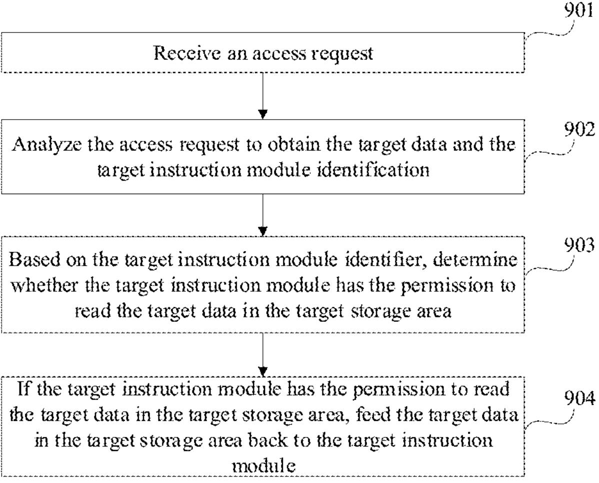
FIG. 9 is a flowchart of the information processing method according to an embodiment of the present disclosure.

FIG. 9 is a flowchart of the information processing method according to an embodiment of the present disclosure. The method can be applied to a storage area controller. The method will be described in detail below.

901, receiving an access request.

In some embodiments, the storage area controller may control other structures to read data in the memory (RAM).

More specifically, the controller may be arranged between the master and the memory.

In some embodiments, the access request may be sent by each master through the bus.

In some embodiments, the master may include the processor in the foregoing method embodiments and other control unit masters.

In some embodiments, the storage area controller may adopt ARM CoreLink TrustZone address space controller (TZC).

902, analyzing the access request to obtain the target data and the target instruction module identification.

In some embodiments, the target instruction module may be an instruction module in the processor that requests the target data. The processor may include at least two instruction modules, and different instruction modules may access data of different security levels.

In some embodiments, if the access request is generated by the processor in the foregoing method embodiment, the access request may include the target instruction module identifier that generates the access request, the storage address of the target data, the storage address of the output data, etc. If the access request is sent by another master, the access request may include the master's identifier, the storage address of the target data, the storage address of the output data, etc.

Since the information processing method applied to the storage are controller in this embodiment corresponds to the information processing method applied to the processor, the access request generated by the processor is described in this embodiment.

More specifically, the access request may be analyzed to obtain the target data and a target instruction module identifier of the target access.

903, based on the target instruction module identifier, determining whether the target instruction module has the permission to read the target data in the target storage area.

In some embodiments, the target instruction module identifier may indicate which instruction module in the processor generated the access request. Based on the target instruction module identifier in the access request, the corresponding target instruction module may be determined, and then whether the target instruction module can read the target data in the target storage area by the permission may be determined.

The process at 903 may include the following processes.

9031, determining the target instruction module based on the target instruction module identifier.

9032, based on the target data, determining a set of instruction modules having the target data reading permission.

In some embodiments, the target data may be determined based on the storage address of the target data in the access request, and the permission required to read the storage address may be determined based on the storage address of the target data.

Subsequently, based on the permission, a set of instruction modules with the read permission may be determined.

9033, if the target instruction module belongs to the instruction module set, determining that the target instruction module corresponding to the target instruction module identifier has the permission to read the target data in the target storage area.

9034. if the target instruction module does not belong to the instruction module set, determining that the target instruction module corresponding to the target instruction module is not limited to reading the target data in the target storage area.

In some embodiments, if the target data is model data, the instruction module with the read permission may be the model download module; if the target data is common data, the instruction module with the read permission may be the data download module.

In some embodiments, if the target instruction module corresponding to the access request does not belong to the set of instruction modules with the read permission, reading the target data may be prohibited. In a specific implementation, a read failure message may be fed back.

904, if the target instruction module has the permission to read the target data in the target storage area, feeding the target data in the target storage area back to the target instruction module.

In some embodiments, if the target instruction module corresponding to the access request belongs to the instruction module set with the read permission, the target data may be read and fed back to the NPU. In this way, the NPU can store the target data to the storage address of the output data in the access request.

It should be noted that other masters may also have the permission to read common data.

Consistent with the present disclosure, the information processing method that can be applied to a storage area controller. The method includes receiving an access request; analyzing the access request to obtain the target data and the target instruction module identification, the target instruction module being an instruction module in the processor that request the target data, the processing including at least two instruction modules, different instruction modules being configured to access data of different security levels; based on the target instruction module identifier, determining whether the target instruction module has the permission to read the target data in the target storage area; and, if the target instruction module has the permission to read the target data in the target storage area, feeding the target data in the target storage area back to the target instruction module. In this embodiment, the processor can respond to access requests generated by different instruction modules. Based on the permission required to read the target data requested by the access request, whether the instruction module that generates the access request has the permission to access the target data can be determined. In this way, different responses to different access requests from the same processor can be implemented.

Corresponding to the foregoing information processing method embodiment, an embodiment of the present disclosure also provides a device embodiment for applying the information processing method.

Figure 10:
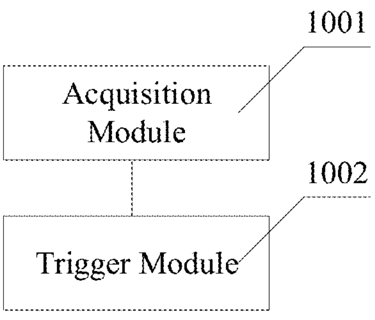
FIG. 10 is a schematic structural diagram of an information processing device according to an embodiment of the present disclosure.

FIG. 10 is a schematic structural diagram of an information processing device according to an embodiment of the present disclosure. The device can be applied to a processor, which may include at least two instruction modules. As shown in FIG. 10, the device includes an acquisition module 1001 and a trigger module 1002.

In some embodiments, the acquisition module 1001 may be configured to obtain the data type of the target data, different data types corresponding to different security levels.

In some embodiments, the trigger module 1002 may be configured to, based on the data type, trigger a target instruction module corresponding to the data type security level of the target data to generate an access request to access a target storage area where the target data is located.

In some embodiments, the access request may include identification information corresponding to the target instruction module, and the identification information may match the security attribute of the target storage area where the target data is located.

In some embodiments, the acquisition module 1001 may be configured to analyze the data reading information to determine the target data storage area in the storage space, the storage space including multiple storage areas, each of which being configured with corresponding security attributes; and determine the data type of the target data based on the security attribute of the target data storage area where the target data is located. Or, the acquisition module 1001 may be configured to analyze the data reading information to obtain the data content of the target data, and based on the data content, determine the data type to which the target data belongs.

In some embodiments, the information processing device may also include an adding module. The adding module may be configured to trigger the target instruction module corresponding to the data type security level of the target data to generate an access request based on the data type, and add the identification information to the access request based on the target instruction module, the identification information indicating that the access request is generated by the target instruction module.

In some embodiments, accessing the target storage area where the target data is located may include: controlling the target data reading module corresponding to the target instruction module to read the target data in the target storage area based on the identification information in the access request; or, determining the target usage period of the data reading module based on the identification information, and controlling the data reading module to read the target data in the target storage area based on the identification information in the access request during the target usage period; or, controlling the data reading module to read the target data in the target storage area based on the identification information in the access request when idle.

In some embodiments, the at least two instruction modules may include a model download module and a data download module. The trigger module may be configured to call the model download module based on the data type of the target data being model data to cause the model download module to generate a first access request, and call the data download module based on the data type of the target data being common data to cause the model download module to generate a second access request.

It should be noted that, for the functional explanation of each component of the information processing device provided in this embodiment, reference can be made to the explanation in the foregoing method embodiment, which will not be repeated here.

Consistent with the present disclosure, the information processing device, which can be applied to a processor having at least two instruction modules, includes an acquisition module and a trigger module. The acquisition module may be configured to obtain the data type of the target data, different data types corresponding to different security levels. The trigger module may be configured to, based on the data type, trigger a target instruction module corresponding to the data type security level of the target data to generate an access request to access a target storage area where the target data is located. In some embodiments, after obtaining the data reading information, the processor may obtain the data type of the to-be-read target data, and then determine the target instruction module corresponding to the security level of the data type based on the data type to generate an access request to access the target storage area where the target data is located. In this way, a processor can access data of different security levels in the storage area, and data of different security levels can only be accessed by modules corresponding to the security level, thereby improving data security in the memory. In addition, there is no need to switch the security state of the processor, nor is there a need to set requirements for the security level of the data processed by the processor.

Figure 11:
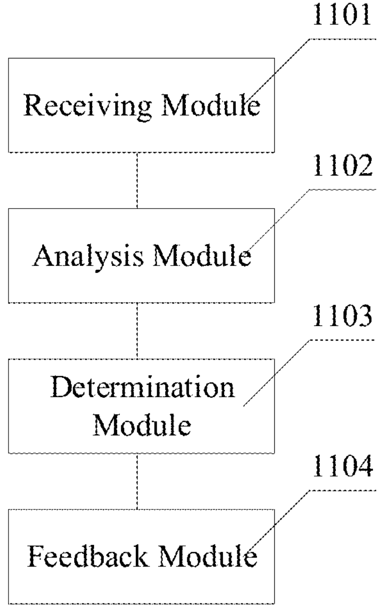
FIG. 11 is a schematic structural diagram of the information processing device according to an embodiment of the present disclosure.

FIG. 11 is a schematic structural diagram of the information processing device according to an embodiment of the present disclosure. The device can be applied to a storage area controller. As shown in FIG. 11, the device includes a receiving module 1101, an analysis module 1102, a determination module 1103, and a feedback module 1104.

In some embodiments, the receiving module 1101 may be configured to receive an access request.

In some embodiments, the analysis module 1102 may be configured to analyze the access request to obtain the target data and the target instruction module identification, the target instruction module being an instruction module in the processor that request the target data, the processing including at least two instruction modules, different instruction modules being configured to access data of different security levels.

In some embodiments, the determination module 1103 may be configured to, based on the target instruction module identifier, determine whether the target instruction module has the permission to read the target data in the target storage area.

In some embodiments, the feedback module 1104 may be configured to, if the target instruction module has the permission to read the target data in the target storage area, feed the target data in the target storage area back to the target instruction module.

It should be noted that, for the functional explanation of each component of the information processing device provided in this embodiment, reference can be made to the explanation in the foregoing method embodiment, which will not be repeated here.

Consistent with the present disclosure, the information processing device, which can be applied to a storage area controller, includes a receiving module, an analysis module, a determination module, and a feedback module. The receiving module may be configured to receive an access request. The analysis module may be configured to analyze the access request to obtain the target data and the target instruction module identification, the target instruction module being an instruction module in the processor that request the target data, the processing including at least two instruction modules, different instruction modules being configured to access data of different security levels. The determination module may be configured to, based on the target instruction module identifier, determine whether the target instruction module has the permission to read the target data in the target storage area. The feedback module may be configured to, if the target instruction module has the permission to read the target data in the target storage area, feed the target data in the target storage area back to the target instruction module. In this embodiment, the processor can respond to access requests generated by different instruction modules. Based on the permission required to read the target data requested by the access request, whether the instruction module that generates the access request has the permission to access the target data can be determined. In this way, different responses to different access requests from the same processor can be implemented.

Corresponding to the foregoing information processing method, an embodiment of the present disclosure also provides a processor embodiment corresponding to the information processing method.

Figure 12:
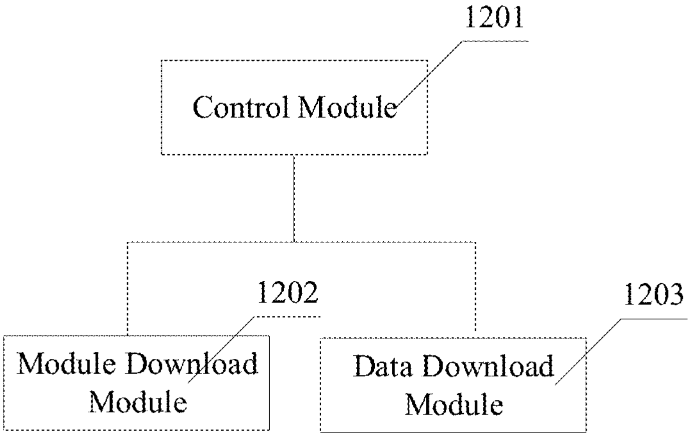
FIG. 12 is a schematic structural diagram of a processor according to an embodiment of the present disclosure.

FIG. 12 is a schematic structural diagram of a processor according to an embodiment of the present disclosure. As shown in FIG. 12, the processor includes a control module 1201, a model download module 1202, and a data download module 1203.

In some embodiments, the control module 1201 may be configured to obtain data reading information, the data reading information being used to read the target data; obtaining the data type of the target data, different data types corresponding to different security levels; and, based on the data type, trigger the model download module or the data download module corresponding to the data type security level of the target data to generate an access request to access the target storage area where the target data is located.

In some embodiments, the model download module may be used to read and download the model data in the memory, and the data download module may be used to read and download the common data in the memory.

In some embodiments, the processor may be an NPU, which may include a model download module and a data download module. The model download module may be configured to read the AI model in the protected area of the memory, while the data download module may be configured to only read the common data in the memory.

For the functional explanation of each structure in the processor, reference can be made to the explanation in the corresponding method embodiment, which will not be repeated here.

Consistent with the present disclosure, the processor includes a control module, a model download module, and a data download module. The control module may be configured to obtain data reading information, the data reading information being used to read the target data; obtaining the data type of the target data, different data types corresponding to different security levels; and, based on the data type, trigger the model download module or the data download module corresponding to the data type security level of the target data to generate an access request to access the target storage area where the target data is located.

Figure 13:
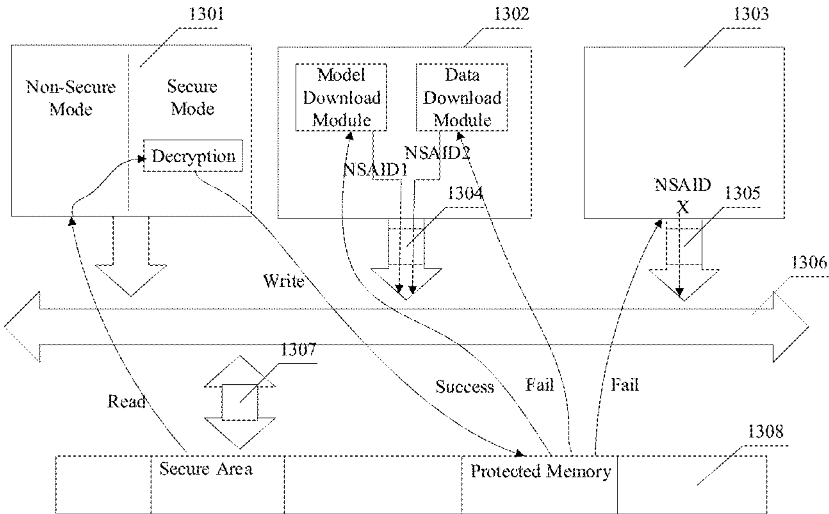
FIG. 13 is a schematic diagram of an application scenario of the information processing method according to an embodiment of the present disclosure.

FIG. 13 is a schematic diagram of an application scenario of the information processing method according to an embodiment of the present disclosure. FIG. 13 includes an application processor 1301, a NPU 1302, a control unit 1303, a DMA 1304-1305, a bus 1306, a TZC 1307, and a memory 1308.

In some embodiments, the application processor (AP) may include a non-secure mode (normal mode) and a secure mode.

In some embodiments, the memory may include a secure area, a protected memory, and a normal memory.

In some embodiments, the AI model data may be first stored in the secure area, and the application processor 1301 may read the undecrypted AI model data through the bus in the non-secure mode. After the application processor switches to the secure mode, the AI model data may be decrypted and written to the protected memory via the bus. The non-model data may be stored in the normal memory.

In some embodiments, the access request generated by the model download module may add the identifier to obtain NSAID1, the access request generated by the NPU data download module may add the identifier to obtain NSAID2, and the access request generated by the control unit 1303 may add the identifier to obtain NSAID X, X≠1 and 2.

In some embodiments, the TZC may be configured to set an access request carrying NSAID1 to read the data in the protected memory (i.e., the decrypted AI model data)

In some embodiments, when the model data needs to be accessed, the NPU 1302 may generate an access request with NSAID1 identifier through the model download module, and the DMA 1304 may upload the access request generated by the model download module to the bus to read the AI model data in the memory and return the AI model data, indicating that the read is successful. When the non-model data needs to be accessed, the NPU 1302 may generate an access request with NSAID2 identifier through the data download module to read the non-model data in the memory, and return the non-model data, indicating that the read is successful.

In some embodiments, when requesting access to the model data, the NPU 1302 may generate an access request with NSAID2 identifier through the data download module due to a failure or other reasons. When the DMA 1304 uploads the access request generated by the data download module to the bus to request to read the AI model data in the memory, the TZC may determine that the corresponding data download module of the access request does not have the permission to read the AI model data and return a read failure message.

In some embodiments, when the DMA 1305 uploads the access request generated by the control unit 1303 to the bus to request to read the AI model data in the memory, the TZC may determine that the control unit does not have the permission to read the AI model data and return a read failure message.

Corresponding to the information processing method embodiments of the present disclosure, the present disclosure further provides an electronic device corresponding to the information processing method and the readable storage medium.

The electronic device can include a memory and a processor.

The memory can store a processing program.

The processor can be configured to load and execute the processing program stored in the memory to implement the steps of any one of the information processing methods above.

For the execution of the information processing method by the electronic device, reference can be made to the information processing method embodiments above.

The readable storage medium can store a computer program, which can be called and executed by the processor to implement the steps of any one of the information processing methods as described in the claims.

For the execution of the information processing method by using the computer program stored in the readable storage medium, reference can be made to the information processing method embodiments above.

The various embodiments of the present disclosure are described in a progressive manner. Each embodiment focuses on the differences from other embodiments. The common and similar parts among the various embodiments can be referred to each other.

Since the device of the present disclosure corresponds to the method of the present disclosure, the device can be described simply. Relevant details can be referred to in the description of the method part.

The description of embodiments of the present disclosure enables those skilled in the art to implement or use the present disclosure. Modifications to these embodiments are apparent to those skilled in the art. The general principle defined here can be implemented in other embodiments without departing from the spirit or scope of the present disclosure. Therefore, the present disclosure is not limited to embodiments of the present disclosure but should conform to the widest scope consistent with the principles and novel features of the present disclosure.

What is claimed is:

1. An information processing method, implemented by a processor, the processor including at least two instruction modules, comprising:

obtaining data reading information, the data reading information being used to read target data;

obtaining a data type of the target data, different data types corresponding to different security levels, wherein the obtaining the data type of the target data comprises analyzing the data reading information to determine a target data storage area in a storage space, the storage space having a plurality of storage areas including the target data storage area, each storage area of the plurality of storage areas being configured with a corresponding security attribute, and determining the data type of the target data based on a security attribute of the target data storage area where the target data is located; and based on the data type, triggering a target instruction module corresponding to the data type security level of the target data to generate an access request to access the target storage area where the target data is located, the access request including identification information corresponding to the target instruction module, the identification information matching the security attribute of the target storage area where the target data is located and indicating that the access request is generated by the target instruction module, wherein the accessing the target storage area where the target data is located includes controlling a target data reading module corresponding to the target instruction module to upload the access request to a bus and read the target data in the target storage area based on the identification information, the target data reading module using direct memory access.

2. The method of claim 1, wherein the obtaining the data type of the target data further includes:

analyzing the data reading information to obtain data content of the target data; and determining the data type to which the target data belongs based on the data content.

3. The method of claim 1, wherein the accessing the target storage area where the target data is located further includes:

based on the identification information, determining a target usage period of the target data reading module; controlling the target data reading module to read the target data in the target storage area based on the identification information in the access request during the target usage period; or, controlling the target data reading module to read the target data in the target storage area based on the identification information in the access request when idle.

4. The method of claim 1, wherein:

the at least two instruction modules include a model download module and a data download module; and triggering the target instruction module corresponding to the data type security level of the target data to generate the access request to access the target storage area where the target data is located includes:

based on the data type of the target data being model data, calling the model download module to cause the model download module to generate a first access request; and based on the data type of the target data being common data, calling the data download module to cause the data download module to generate a second access request.

5. An information processing method, implemented by a storage area controller arranged between a master and a memory, comprising:

receiving an access request;

analyzing the access request to obtain target data, a target instruction module identifier of a target access, and a storage address of the target data, a target instruction module being an instruction module in a processor for requesting the target data, the processor including at least two instruction modules, different instruction modules being configured to access data of different security levels;

based on the target instruction module identifier, determining whether the target instruction module has permission to read the target data in a target storage area by determining the target instruction module based on the target instruction module identifier, determining, based on the storage address of the target data, a set of instruction modules having permission to read the target data, and determining that the target instruction module has the permission in response to the target instruction module belonging to the set of instruction modules; and in response to the target instruction module having the permission to read the target data in the target storage area, feeding the target data in the target storage area back to the target instruction module, and in response to the target instruction module not having the permission to read the target data in the target storage area, returning a read failure message.

6. A processor comprising:

a model download module;

a data download module; and a control module, the control module being configured to perform an information processing method comprising:

obtaining data reading information, the data reading information being used to read target data;

obtaining a data type of the target data, different data types corresponding to different security levels, wherein the obtaining the data type of the target data comprises analyzing the data reading information to determine a target data storage area in a storage space, the storage space having a plurality of storage areas including the target data storage area, each storage area of the plurality of storage areas being configured with a corresponding security attribute, and determining the data type of the target data based on a security attribute of the target data storage area where the target data is located; and based on the data type, triggering a target instruction module corresponding to the data type security level of the target data to generate an access request to access the target storage area where the target data is located, the access request including identification information corresponding to the target instruction module, the identification information matching the security attribute of the target storage area where the target data is located and indicating that the access request is generated by the target instruction module, wherein the accessing the target storage area where the target data is located includes controlling a target data reading module corresponding to the target instruction module to upload the access request to a bus and read the target data in the target storage area based on the identification information, the target data reading module using direct memory access.

7. The processor of claim 6, wherein the obtaining the data type of the target data further includes:

analyzing the data reading information to obtain data content of the target data; and determining the data type to which the target data belongs based on the data content.

8. The processor of claim 6, wherein the accessing the target storage area where the target data is located further includes:

based on the identification information, determining a target usage period of the target data reading module; controlling the target data reading module to read the target data in the target storage area based on the identification information in the access request during the target usage period; or, controlling the target data reading module to read the target data in the target storage area based on the identification information in the access request when idle.

9. The processor of claim 6, wherein:

triggering the target instruction module corresponding to the data type security level of the target data to generate the access request to access the target storage area where the target data is located includes:

based on the data type of the target data being model data, calling the model download module to cause the model download module to generate a first access request; and based on the data type of the target data being common data, calling the data download module to cause the data download module to generate a second access request.

* * * * *